United States Patent Office 2,736,644
Patented Feb. 28, 1956

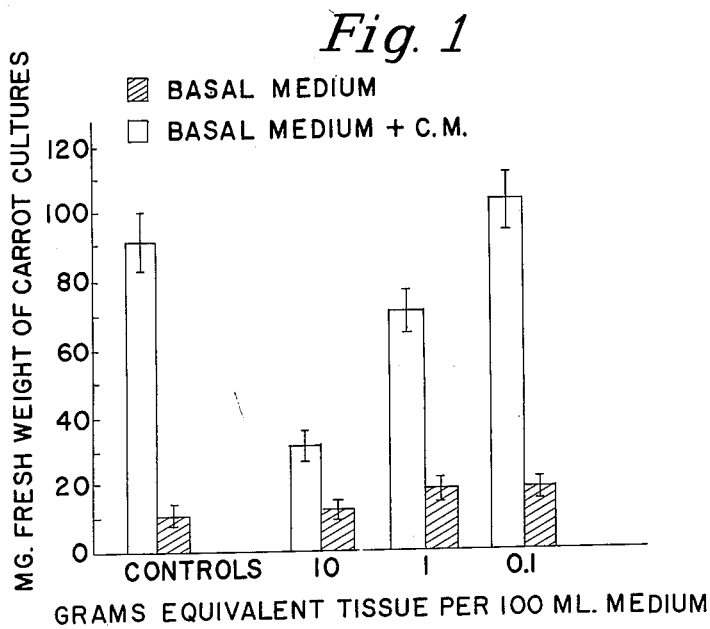
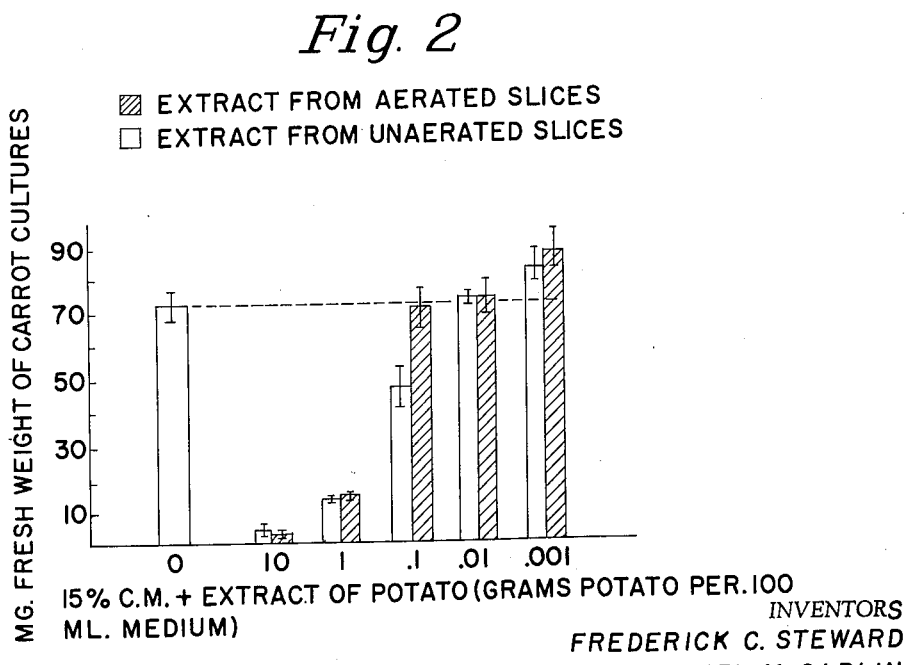

2,736,644
METHOD AND COMPOSITIONS FOR REGULATING PLANT GROWTH

Frederick C. Steward, Ithaca, and Samuel M. Caplin, Rochester, N. Y.

Application December 3, 1954, Serial No. 473,007

6 Claims. (Cl. 71—2.3)

This invention relates to compositions comprising coconut milk and an hydroxylic extract of tissue of an angiosperm of the class consisting of onion bulb and potato tuber. More particularly, this invention relates to compositions comprising coconut milk factor in admixture with a growth inhibitor for said coconut milk, the inhibitor being an hydroxylic extract of onion bulb tissue or of potato tissue.

This application is a continuation-in-part of our copending application, Serial No. 285,412, filed April 13, 1952, now abandoned.

Onion juice has been claimed to enhance the physiological activity of auxins on plants. The growth-promoting activity both of indoleacetic acid and 2,4-D are reportedly increased by use of onion juice but this has been attributed to its sugar content.

In our copending application, Serial No. 285,411, now abandoned, but filed concurrently with our parent application, Serial No. 285,412, we have described the synergistic effect of compositions containing coconut milk and synthetic plant regulants such as 2,4-D on the promotion of growth of potato tissue.

To our surprise we have now found that upon substituting onion extract for 2,4-D in a nutrient medium containing coconut milk the growth of certain plant tissue, such as for instance carrot root and Jerusalem artichoke tuber, is substantially inhibited. We have further found that when an hydroxylic extract of tissue of another angiosperm, namely, potato tissue (widely used in microbiology as a general nutrient) is admixed with a nutrient medium containing coconut milk the extract functions as does onion extract and inhibits the growth of plant cells.

The invention will be described with particular reference to the inhibition of the growth promoting qualities of coconut milk as determined by the carrot assay method but it is to be understood that the compositions of our invention inhibit the growth of other types of plant cells than those of the carrot root.

It is already known that the growth-promoting qualities of coconut milk, which enable rapid proliferative growth of the secondary phloem of carrot root to be obtained under tissue culture conditions, are due to a heat stable, water soluble substance or substances which are referred to hereinafter as the coconut milk growth factor (C. M. F.). The isolation and identification of C. M. F. are more fully described and claimed in the copending United States application of Frederick C. Steward and Edgar M. Shantz, Serial No. 365,182, filed June 30, 1953.

The growth factor can also be obtained from other sources notably immature corn (Zea) grains and other similar sources in which there is a relatively precocious growth of the endosperm.

The coconut milk factor, which is most conveniently found in the liquid endosperm of coconut, occurs at all stages after fertilization. In the immature fruit of Zea it is especially abundant about 2 weeks after pollination. The factor is also found in the developing female gametophyte of Ginkgo—as a representative of a haploid nutritive tissue, and in certain plant tumors in which cells return to the permanently proliferating state.

In addition to coconut milk the compositions of this invention contain an hydroxylic extract of an angiosperm of the class consisting of onion bulb and potato tuber. The inhibitor in potato is more abundant in the periderm than in the parenchyma.

By the term, an hydroxylic extract, we mean to include aqueous extracts, lower aliphatic alcoholic (1–6 carbon atoms) extracts, and aqueous lower aliphatic alcoholic extracts.

The hydroxylic extracts of onion bulb and potato tissue are prepared by any conventional method. The angiosperm tissue in the fresh or dried state is preferably extracted with hot water, although the inhibitory substances can also be extracted by other hydroxylic solvents such as for instance, methyl alcohol, ethyl alcohol, n-propyl alcohol, isobutyl alcohol, isohexyl alcohol, and alcohol-water mixtures.

It will be understood that the living cells of the plant tissue are killed by the hot water, or by the alcohol during the extraction step. In the event the tissue is autoclaved the living cells are also killed, the soluble constituents thereupon diffusing out.

The resulting extract may be filtered. The filtrate may be further diluted preparatory to use in the compositions of our invention.

In operating in accordance with the present invention any suitable amount of the aforementioned plant extract may be used to inhibit the growth-promoting qualities of coconut milk on plant cells in any conventional nutrient medium, such as for instance, White's nutrient solution ("A Handbook of Plant Tissue Culture" by Philip R. White. The Jacques Cattell Press, Lancaster, Pa. 1943).

The relative proportions of a given extract with coconut milk will vary depending upon such factors as the particular extract employed, the plant material whose growth is to be inhibited, the physiological condition of the material so treated, and the environmental conditions.

It is impossible, therefore, to state exactly the proportions that will be used in all situations. In general, the compositions of the invention will contain inhibitory substances in an extract of from about 1.0 to 10 grams of plant tissue per 100 ml. of medium, said medium containing about at least 3% but not more than about 15% by volume of coconut milk or its equivalent of isolated C. M. F. factor.

It will be understood that the failure of mature plant cells to grow in the presence of a full nutrient containing compositions of the invention is due to the presence of inhibitors for the growth-promoting qualities of coconut milk and not to too much coconut milk growth factor.

The utility of the present invention resides in the control that it gives over the ability of plant cells to grow by division: the growth being promoted by one set of factors (as in the use of coconut milk) and repressed by another (as in the use of extracts of onion and potato tissue with the claimed inhibitory actions).

The nature of this invention will be better understood by reference to the following illustrative examples:

Example 1

The inhibitory effect of a composition containing coconut milk and onion extract on the growth of carrot explants in a basal medium is illustrated by this example.

A description of the nutrient and other conditions under which standard explants of carrot roots can be accurately and reproducibly grown is found in our articles appearing in Nature 163,920 (1949) and Ann. Bot. N. S. 16, Nos. 62 and 64 (1952). It will be understood that one of the standard conditions described in the aforementioned articles for the growth of carrot-root explants is the use of a basal medium supplemented by 15 per cent by volume of coconut milk.

In brief, our carrot assay method makes use of "Pyrex" glass culture tubes rounded at each end and mounted on disks which are slowly revolved about a horizontal shaft so that each tube is tumbled end over end. At the middle of each tube is a side neck through which the transfer of cultures can be made and, when plugged with cotton, through which gas exchange can occur.

The cultures in these klinostat tubes were grown on a basal nutrient medium having the following composition:

| Salts: | Mg./liter |
|---|---|
| $MgSO_4$ | 360.0 |
| $Ca(NO_3)_2$ | 200.0 |
| $Na_2SO_4$ | 200.0 |
| $KNO_3$ | 80.0 |
| KCl | 65.0 |
| $NaH_2PO_4.H_2O$ | 16.5 |
| $Fe_2(C_4H_4O_6)_3$ | 2.5 |
| $MnSO_4$ | 4.5 |
| $ZnSO_4$ | 1.5 |
| $H_3BO_3$ | 1.5 |
| KI | 0.75 |
| Sucrose | 20,000.0 |
| Glycine | 3.0 |
| Nicotinic acid | 0.5 |
| Pyridoxine | 0.1 |
| Thiamin | 0.1 |

All of the explants were obtained from carrot roots in the form of cylinders, removed by a cannula, and cut with a multibladed cutter into 3 mg. radial segments. Only phloem cylinders with their inner tangential surface 1 mm. from the cambium were used.

Hot water (about 50–80° C.) extracts of onion bulb tissue were made and added to the nutrient medium for carrot explants. The data shown in Figure 1 are recorded in terms of the effect of onion juice on the growth of carrot explants under the above described standard conditions.

*Example 2*

The inhibitory effect of an aqueous potato tissue extract on the growth of carrots in a culture containing coconut milk was as follows:

Using the cannula used to cut carrot plugs, cylinders of potato tubers were removed and placed in the rotating culture tubes together with basal medium and coconut milk. The medium containing the tissue was then autoclaved and the tube was inoculated with a standard carrot explant.

The effect of added potato extract on the growth of carrot in the presence of coconut milk is shown in Figure 2.

We claim:
1. A plant growth regulating composition comprising coconut milk and, in an amount sufficient to exert inhibitory action on the plant growth-promoting activity of coconut milk, a hydroxylic extract of plant tissue of an angiosperm of the class consisting of onion bulb and potato tuber, the extraction of from about 1 to 10 grams of said plant tissue yielding an extract containing an amount of an inhibitory substance sufficient to inhibit the plant growth-promoting activity of coconut milk when said extract is mixed with 100 milliliters of nutrient medium containing from about 3 to 15% by volume of coconut milk.

2. A composition of claim 1 wherein the extract is an aqueous extract.

3. A composition of claim 1 wherein the extract is an alcoholic extract.

4. A plant growth regulating composition comprising coconut milk and, in an amount sufficient to exert inhibitory action on coconut milk-stimulated growth of plant cells, an aqueous extract of onion bulb tissue, the aqueous extraction of from about 1 to 10 grams of said tissue yielding an extract containing an amount of an inhibitory substance sufficient to inhibit the growth promoting activity of coconut milk on plant cells in 100 milliliters of nutrient medium containing from about 3 to 15% by volume of coconut milk.

5. A plant growth regulating composition comprising coconut milk and, in an amount sufficient to exert inhibitory action on coconut milk-stimulated growth of plant cells, an aqueous extract of potato tissue, the aqueous extraction of from about 1 to 10 grams of said tissue yielding an amount of inhibitory substance sufficient to inhibit the growth promoting activity of coconut milk on plant cells in 100 milliliters of nutrient medium containing from about 3 to 15% by volume of coconut milk.

6. A method which comprises applying to plant tissue a composition containing coconut milk and, in an amount sufficient to exert inhibitory action on the growth promoting activity of coconut milk, an hydroxylic extract of plant tissue of an angiosperm selected from the group consisting of onion and potato, the extraction of from about 1 to 10 grams of said plant tissue yielding an extract containing an amount of an inhibitory substance sufficient to inhibit the growth-promoting activity of coconut milk in 100 milliliters of nutrient medium containing from about 3 to 15% by volume of coconut milk.

References Cited in the file of this patent

"Science," vol. 108, Dec. 10, 1948, pages 655 to 657.

"Cosmopolitan Fish Cookery for the Phillipines," U. S. Dept. of the Interior, Fish and Wildlife Service Avery Leaflet 377 (Rec'd. in U. S. Patent Office Library August 18, 1950), pages 28 and 29.